United States Patent [19]

Melton et al.

[11] 3,997,078
[45] Dec. 14, 1976

[54] SEALING COVER FOR CONTAINERS FOR HAZARDOUS MATERIALS

[75] Inventors: Donald F. Melton, Minneapolis; Karl E. Neumeier, Stillwater, both of Minn.

[73] Assignee: Programmed & Remote Systems Corporation, St. Paul, Minn.

[22] Filed: Dec. 13, 1974

[21] Appl. No.: 532,623

[52] U.S. Cl. .............................................. 220/315
[51] Int. Cl.² ........................................ B65D 45/00
[58] Field of Search ........... 220/203, 315, 316, 323

[56] References Cited
UNITED STATES PATENTS

| | | | |
|---|---|---|---|
| 2,552,053 | 5/1951 | Miller | 220/315 |
| 3,765,645 | 10/1973 | Paul | 220/315 |
| 3,780,901 | 12/1973 | Pechacek | 220/315 |

*Primary Examiner*—Ro E. Hart
*Attorney, Agent, or Firm*—Dugger, Johnson & Westman

[57] ABSTRACT

A sealing cover for shipping containers for hazardous materials, such as nuclear fuels, which cover has a twist locking member which may be operated when the cover is under sufficient external force to provide an adequate seal. The cover includes resilient members which, once the cover is locked in place, continue to exert the necessary force on the seals to keep the container tightly sealed. The cover has a safety feature of being tightly locked so that the cover cannot be easily or accidently removed.

17 Claims, 5 Drawing Figures

SEALING COVER FOR CONTAINERS FOR HAZARDOUS MATERIALS

BACKGROUND OF THE INVENTION

1. Field of the Invention

The present invention relates to a cover for containers which may hold hazardous material.

2. Prior Art

In the prior art, nuclear fuel shipping containers generally have had covers which were held in place with a plurality of screw threaded latches around the periphery of the container. These latches are difficult to manipulate mechanically, that is, with remotely controlled devices, and are slow to operate. Further, the threaded members can be removed without special tools, which makes nuclear contamination from unauthorized or accidental opening a distinct possibility.

SUMMARY OF THE INVENTION

The present invention relates to a cover for containers. The cover is adapted to be sealed with respect to the container and to maintain the seal during storage and transport. The cover has a twist lock that is operable when the cover is being held at a high external force against its seals. The cover may be mechanically locked in place positively.

The primary seals between the cover and the container as shown are two stainless steel O-rings. The O-rings are located on the bottom side of a lower cover plate, and contact a flat shoulder surface formed on the container. The seal is made by exerting a high force on the upper cover plate that is attached to the lower plate in the center portions of the cover. Near the peripheral edges of the cover the upper and lower cover plates are spaced and not attached. Resilient means, as shown Belleville springs, are provided between the upper and lower plates so that when the cover is locked into position, the resilient means continue to exert the necessary sealing force against the lower plate to maintain the seal between the O-rings and the flat surface on which they seal.

The cover includes means for checking the integrity of the O-ring seals after the cover has been mounted into place, and further the cover includes means for permitting handling of the cover mechanically.

The cover therefore has the advantage of being capable of being forced against its provided seat with a high force on the upper plate to effect a tight seal between the cover O-rings and surfaces of the container which the cover is mounted, without binding a locking ring which is twist locked into position to lock the cover in place. When the external force is removed from the upper plate, the locking ring holds the upper plate of the cover in position, while the springs, in the form shown Belleville springs, continue to exert a substantial force against the lower portion of the cover member.

DESCRIPTION OF THE PREFERRED EMBODIMENT

Figure 1:
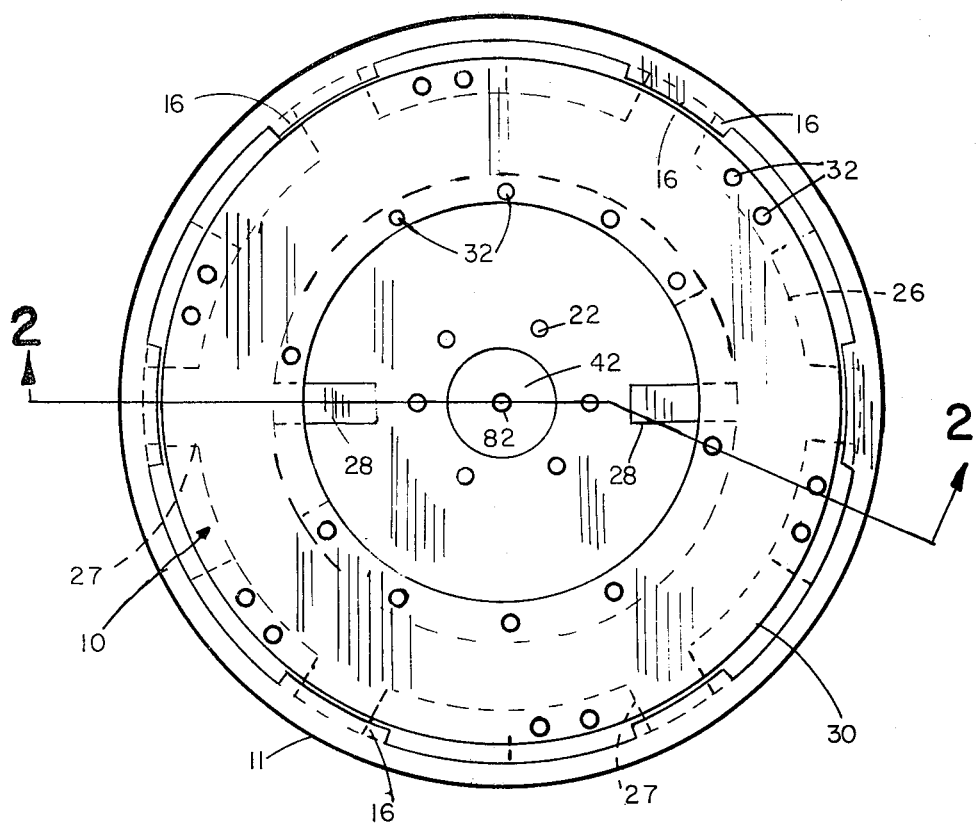
FIG. 1 is a top plan view of a container cover made according to the present invention shown installed on a container.
Figure 3:
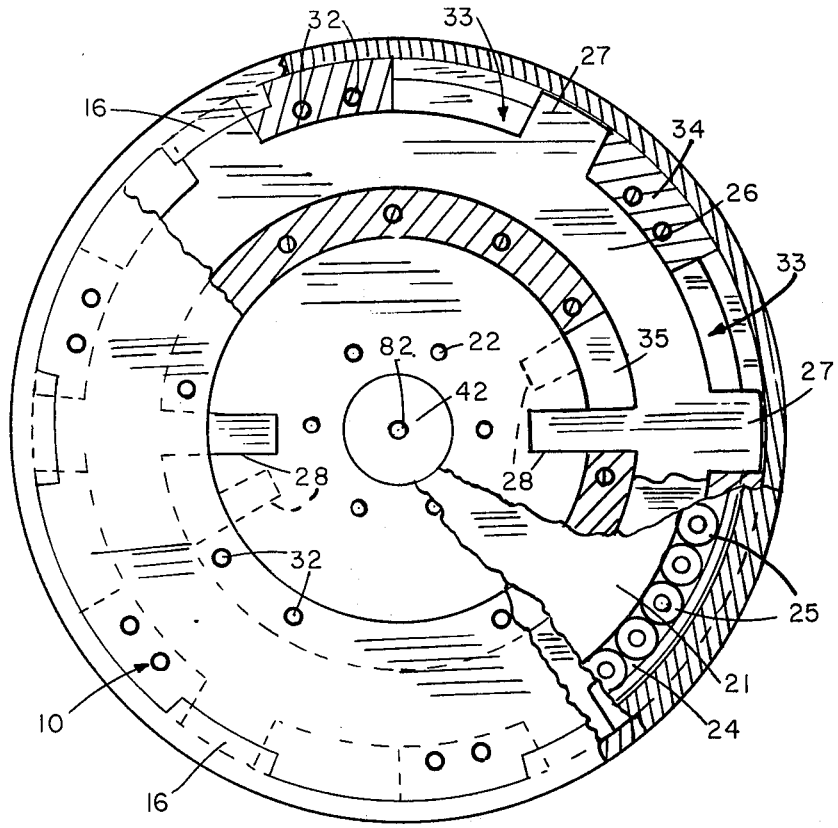
FIG. 3 is a top plan view similar to FIG. 1 with parts in section and parts broken away.
Figure 2:
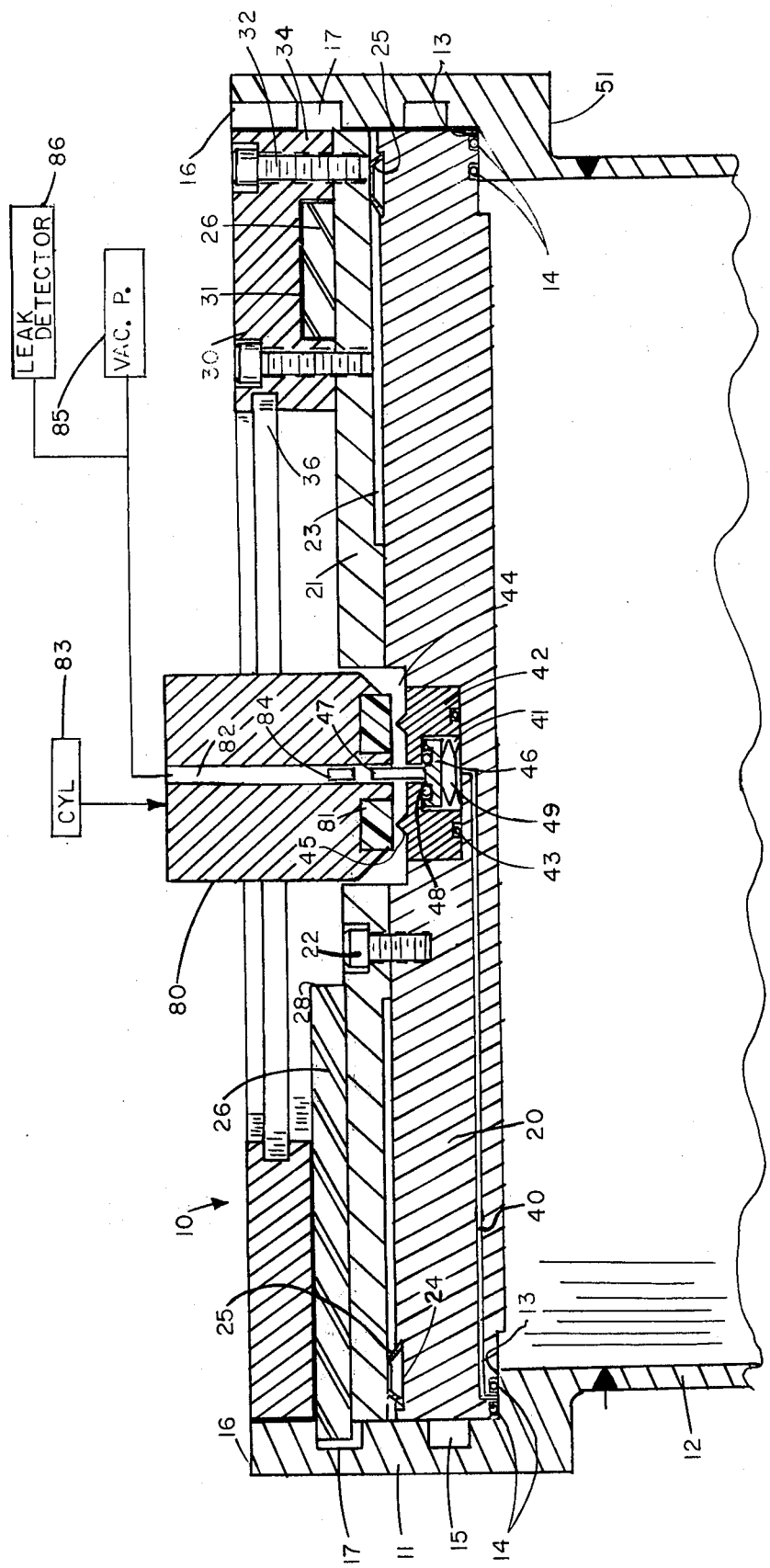
FIG. 2 is a vertical sectional view taken substantially along lines 2—2 in FIG. 1 and schematically showing a leak test coupling in position.

Referring first to FIGS. 1, 2 and 3, the arrangement of a fuel container, or container for hazardous material and the cover assembly is shown. The containers are cylindrical cans having a closed end which is not shown, and an open end on which the closing cover is secured.

A cover assembly illustrated generally at 10 is positioned within an end opening defined by an annular housing neck 11 that forms a top portion of a container 12 in which hazardous material, such as spent nuclear fuel, is contained for shipping. The nuclear fuel is bathed in helium, and is generally handled with it is at quite high temperatures in the range of 700° Fahrenheit. Because of this environment, elastomeric materials are not suitable for sealing members because they will not withstand the temperatures for the extended periods of time necessary. Thus, it is desired that metallic O-rings or other nonelastomeric seals be used. Metallic O-rings and other metallic seals are quite well known in the trade. However, metal O-rings require quite high compression forces for sealing and this compounds the problem of making a suitable container cover.

In the form shown, the neck 11 defines an opening and has an interior annular shoulder surface indicated generally at 13 on which the cover assembly 10 rests and seals. As shown, two suitable concentric metal O-rings 14,14 are mounted in grooves in the lower surface of the cover assembly and seat against the shoulder surface 13. The surface 13 is flat and can be accurately machined for proper sealing. The O-rings preferably are metallic, tubular O-rings and are commonly available on the market from United Aircraft Products, Inc. and others.

The housing neck 11 has an interior annular groove 15 defined therein adjacent the shoulder 13, and just a short distance above it, and this groove 15 as will be explained provides a grappling interface compatible with the grapple members that are used for the cover so that the container can be handled mechanically through mechanical arms or the like. Adjacent the upper edges of the housing neck 11, there are a plurality of inwardly projecting lugs 16, as shown in FIG. 1, and these lugs are defined by recessed portions between the lugs, and underneath the lugs there is a groove formed as indicated at 17 in FIG. 2.

The cover assembly 10 includes a lower cover plate 20 that is of diameter to fit within the interior of the housing neck 11 (it clears the inner edges of lugs 16), and rest on the shoulder 13. The lower cover plate 20 has the grooves on the underside thereof in which the metallic O-rings 14,14 are placed. The cover assembly also includes an upper cover plate 21, which is fastened with suitable cap screws 22 to the lower cover plate adjacent the center portions of the lower cover plate, as shown in FIG. 2. The upper cover plate has a relief or recess 23 on its lower side so that it contacts the lower cover plate only in the center portions in the area where the cap screws 22 are located.

Adjacent the outer periphery of the upper surface of the lower cover plate 20 there is a shallow annular groove 24 and a plurality of Belleville spring washers 25 are positioned in this groove. The spring washers 25 are trapped between the lower cover plate 20 and the upper cover plate 21 when the upper cover plate is fastened in position. These Belleville spring washers are also shown in FIG. 3 where the upper cover plate is broken away.

A locking ring 26 is slidably supported on the upper surface of the upper cover plate. The locking ring has a plurality of spaced locking dogs 27 extending radially outwardly from the outer periphery of the ring as can perhaps best be seen in FIG. 3, and has two lugs 28 extending inwardly from the ring at diametrically opposed positions. As shown, there are six locking dogs 27, which are used to lock underneath the six lugs 16 on the neck portion of the container 12. The dogs 27 will fit into the interior of the neck between lugs 16.

The locking ring is slidably and rotatably mounted on the top of the upper plate 21, but is guided and retained by a retainer ring 30. The retainer ring 30 is positioned as shown adjacent the outer periphery of the upper plate 21, and has a recess 31 in the bottom surface thereof that extends annularly around the retainer ring 30 to slidably receive the locking ring 26. The retainer ring 30, as shown, is supported directly on and is fixed to the upper cover plate 21 with suitable cap screws 32. The retainer ring 30 also has slots defined therein extending from the annular recess 31 outwardly to the outer periphery of the ring to permit the dogs 27 to slidably pass underneath portions of the locking ring that extend outwardly beyond the outer periphery of the locking ring. These recesses are indicated generally at 33 in FIG. 3, where the retainer ring has been broken away to show the locking ring 26. These recesses 33 are separated therefore by support lugs 34 which are shown in cross section in FIG. 3, and are part of the retainer ring.

In addition the retainer ring 30 has recesses 35 to permit the lugs 28 to slidably extend toward the center of the cover. The recesses 35 on the inner edge of the locking ring extend annularly for the same number of degrees as the recesses 33 for the lugs 27 so that the locking ring can rotate underneath the retainer ring this limited number of degrees.

After closing spent fuel containers 12, it is necessary to determine the leak rate of the O-ring seals 14. If the specified leak rate is exceeded, the container is not considered to be properly closed. Therefore, the cover assembly 10 includes means for determining the leak rate of the O-rings. As shown, the lower cover plate 20 has a radial passageway 40 formed therein, and this passageway 40 has a connecting portion that opens between the O-rings 14,14. The passageway 40 extends to the center of the plate 20, and extends upwardly to open into a valve chamber 41 defined in a valve block 42 that is threaded into a recess in the center portions of the lower cover plate. The valve block 42 is sealed with respect to the bottom surface of the recess in which it is mounted with a suitable metal O-ring 43. As can be seen, there is a recess 44 in the upper surface of the cover plate that aligns with an opening in the center of the upper cover plate 21 and is slightly larger in diameter than the valve block 42. The upper surface of the valve block 42 has an annular raised bead 45 formed thereon, and protruding above the general plane of the valve block. The bead has a cross section which is like an inverted V, so that it defines an annular, relatively narrow edge.

A headed poppet type valve 46 is mounted in chamber 41 and has a stem 47 protruding through a provided opening in the center of the valve block 42. An O-ring 48 surrounds the stem 47 and seals against the upper surface of the valve chamber 41. Suitable spring members 49 can be provided on the bottom side of the valve 46 to force the valve head in direction upwardly from the fuel container, and cause the O-ring 48 to seal off the passageway surrounding the stem 47, which comprises the valve opening. The operation of this poppet type valve for checking the leak rate of the O-rings 14 will be more fully explained later.

Figure 4:
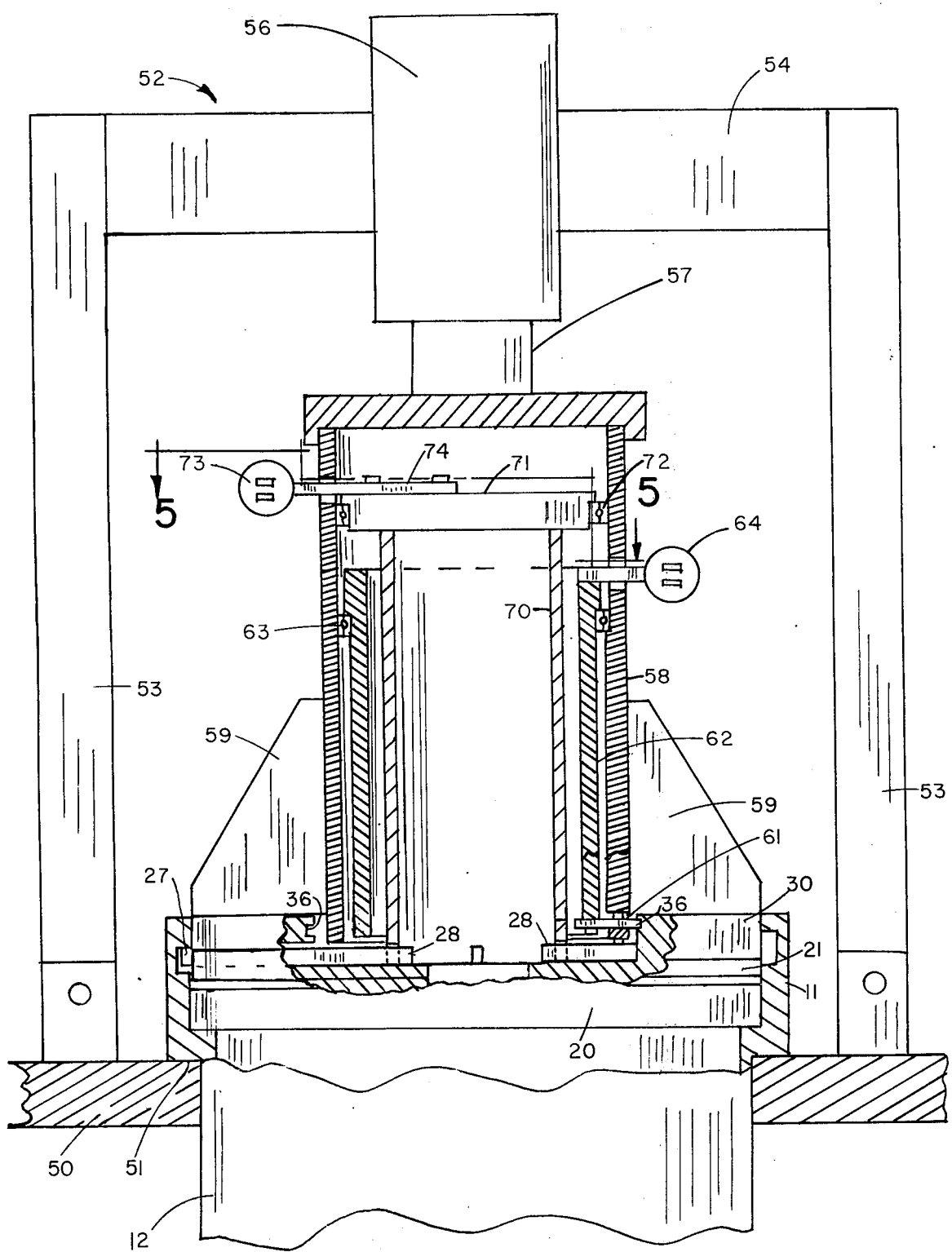
FIG. 4 is a part schematic view of a machine used for installing container covers made according to the present invention on containers.

In order to secure the cover assembly 10 onto the container, it is necessary to exert a substantial downward force to compress the O-rings 14 and cause them to seal. Referring now to FIG. 4 a schematic representation of a fixture that can be used for installing the covers is shown. In the form of the invention shown, a force in the range of 100,000 pounds must be exerted on the cover relative to the container, in the embodiment shown.

A support 50 is provided and it has an opening into which the container 12 will slip. The support 50 engages a shoulder 51 defined by the outer periphery of the neck 11 of the container. Thus the container is supported by this shoulder on the support member 50.

A bridge indicated generally at 52 may be provided, and can be of any desired configuration but as shown includes upright supports 53 that are attached to the support 50, and a cross member 54 that is attached to the upright supports 53. The supports 53 can be installed in any desired manner, and can be removable if desired. In addition, if they are removable or releasable, a suitable hoist may be provided for lifting and lowering the bridge 52 and for moving it to desired locations.

The cross member 54 as shown is used for mounting a hydraulic or other suitable type of actuator or cylinder 56 that has an extendable and retractable rod 57. The rod 57 is connected to a tube 58, that extends downward toward the container neck 11, and the tube 58 includes a plurality of vanes or outwardly extending members 59 that are of size to engage and bear against the upper surface of the retainer ring 30 before the end of tube 58 contacts the cover plate. This tube 58 can be actuated to exert a downward force on the retainer ring 30 when the cylinder 56 is actuated to extend the rod 57. This force will be reacted through the cross member 54, and supports 53 to the support 50, which is holding the neck portion 11 securely from movement. In this manner, the downward force necessary to compress the O-rings 14 can be provided by the actuator 56.

Figure 5:
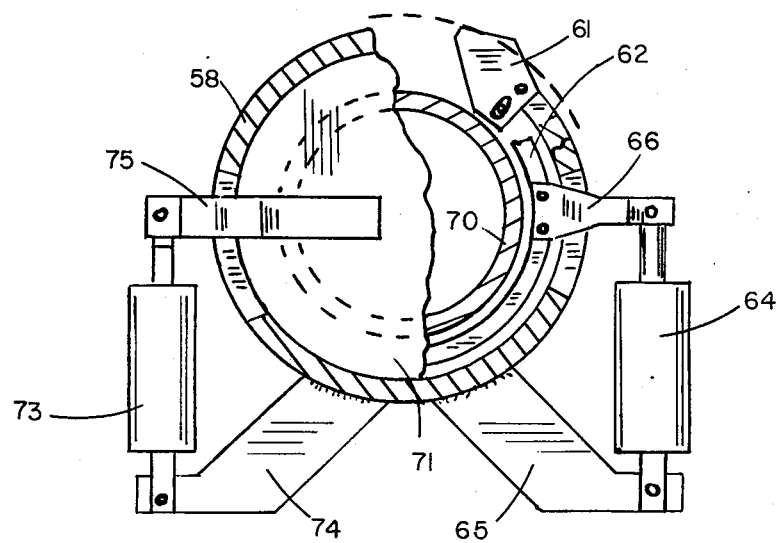
FIG. 5 is a sectional view taken generally along 5—5 in FIG. 4 with parts further broken away to show details of construction.

By way of illustration, it can be noted that the interior surface of ring 30 has an annular grappling groove 36 that extends around the periphery of the interior opening of the locking ring. This grappling groove 36 is used for providing means for lifting and lowering the cover assembly. Cam dogs, one of which is illustrated generally at 61 are provided for engaging the grappling groove 36, and as shown in FIG. 5, these cam dogs (usually at least three are used) are pivoted to the outer tube 58 adjacent the lower end thereof, and are controlled by the relative rotational position of a tube 62 that is concentric with the tube 58, and mounted on suitable bearings 63 within the tube 58.

Tube 62 can be rotated a limited number of degrees with respect to the outer tube 58 through the use of a cylinder 64 acting between a support arm 65 attached to the outer tube 58, and a lever arm 66 that is attached to the tube 62. The arm 66 extends through a provided slot or opening in the side wall of the tube 58. The lower end of tube 62 has pins fixed thereon which extend into slots defined in dogs 61 and when the tube 62 is twisted it actuates or pivots the dogs 61 to an extended position wherein the tabs will enter the grappling groove depending on the direction of movement of the inner tube 62. In FIG. 5, the dotted line adjacent the dog 61 represents the inner edge of ring 30. Other suitable grappling means can be provided. The same type of grapple may be used for lifting the container in combination with the groove 15.

A third tube indicated generally at 70 can be concentrically mounted with respect to the outer tube 58 and tube 62. A suitable support plate 71 is fixed to the upper end of the tube 70 and bearings 72 are used to rotatably mount the plate 71 and attached tube 70 with respect to outer tube 58. As shown the tube 70 is positioned inside the tube 62. The lower end of the tube 70 has a pair of slots or recesses defined therein which fit over the lugs 28 on the locking ring and the edges of the slots will drive the lugs 28 if tube 70 is twisted or rotated.

The inner tube 70 can be actuated for rotation about its central upright axis through the use of a cylinder 73 that is mounted on a support arm 74 fixed to tube 58 and which operates an actuator arm 75 attached to the support plate 71. The cylinder 75 is operated in much the same manner as the cylinder 64 through a suitable valve control. Extension or retraction of the cylinder 73 will cause the tube 70 to be rotated on the bearings 72 a limited number of degrees, and this rotation will rotate or drive the locking ring 26 a desired number of degrees by moving lugs 28, which in turn will move the dogs 27 between an unlocked position where dogs 27 clear the lugs 16 on the neck portion of the container, and a locked position where the dogs 27 are underneath these lugs 16. The cylinder 76 thus mechanically actuates the locking ring between its two positions.

If desired, suitable indexing members such as spring detents can be provided on the cover and the actuator assembly so that the cover is properly oriented when it is first held by the grappling dogs 61 so that the operation will be precise. Likewise, the position of the container neck 11 with respect to the support 50 can be predetermined so that the cover will be properly positioned when placed onto the container.

The vertical or closing force form the outer tube 58 and the members 59 onto the retainer ring 30 is transferred directly to the upper cover plate 21, through the lug portions of the retainer ring that contact the upper cover plate, and this force in turn is exerted against the Belleville springs 25, which are arranged continuously around the periphery of the cover assembly to force the Belleville springs to compress to exert force onto the lower cover plate 20. The force on the lower cover plate is reacted by O-rings 14 onto shoulder surface 13. This force compresses and seals the O-rings 14. The upper plate 21 bends like a cantilever, and the Belleville springs can be compressed a sufficient amount so that the locking dogs 27 will pass underneath the lugs 16 for locking by operating cylinder 73. The force from cylinder 56 can be relieved and the dogs 27 will seat against the underside's of lugs 16. The small amount of movement of the locking ring and top plate as the dogs 27 seat against lugs 16 does not substantially diminish the force exerted by Belleville springs 25 and thus the seal integrity is maintained.

The dogs 61 can be retracted so that they clear the grappling groove 36, and when the tube 58 is lifted so that the members 59 no longer engage the retaining ring 30. The dogs 27 will be held from upward movement by the lugs 16, and the Belleville springs will be still compressed a sufficient amount to exert the necessary compressive force to maintain a seal on the O-rings 14,14.

One of the problems of this type of locking arrangement without the Belleville springs in position is that any slight movement is detrimental to the seal, and the force exerted on the seal reduces almost immediately. The O-rings themselves compress very little, so that very little movement of the lower plate can be tolerated without breaking the seal, but the Belleville springs provide compensation for movement of the locking ring and upper plate as the ring engages the lugs 16.

When the cover is being installed, the retainer ring 30 carries all of the load necessary to effect the seal with the O-rings 14, and the locking ring 26 can be freely moved between its locked or unlocked positions even while the closing force is being applied to the retainer ring.

When the cylinder 56 is retracted, the friction force between the dogs 27 and the lugs 16 is extremely high under the forces exerted by the Belleville springs 25, so opening the cover is not merely a matter of hammering the locking ring to an open position. The cover is basically held in position until some type of a fixture or arrangement for exerting a substantial downward force on the retainer ring relative to the neck portion 11 is provided. Thus, the security of the container and the contents thereof is enhanced with the present locking device.

The center valve assembly used for testing leaks, as shown, normally seals with the O-ring 48. It is therefore important not only to insure that the O-rings 14,14 are sealed, but also to make sure that the ring 48 is sealing properly as well.

The nuclear fuel in the container is normally in a helium atmosphere, and the cover assembly is normally placed into position under a helium atmosphere as well. Thus, measurement of helium leaks may be used to determine whether or not the O-rings 14 are properly sealed. Very precise mass spectrometers used for detecting helium are available, and are used as the leak detectors. A coupling member indicated generally at 80 comprises a cylindrical member (this is shown primarily schematically) that fits within the interior opening of the upper cover plate 21, and the fitting or coupling 80 has an elastomeric insert 81 at the lower end thereof. The insert 81 is annular and surrounds a center passageway 82 in the coupling. The elastomeric insert 81 aligns with the rib 45, and when the member 80 is placed into position, it can be forced downwardly toward the rib with a cylinder indicated schematically at 83 with a measured amount of force so that the elastomeric member 81 engages the rib 48 and seals on the upper edge of the rib. Approximately 200 pounds of force from the cylinder 83 onto the coupling 80 will cause a seal to be effected between the elastomeric member 81 and the rib 45. This means that the center opening for the valve stem 47 in the valve block 42 is then sealed from the atmosphere surrounding the member 80.

At this point, with 200 pounds force on the coupling the valve opening (surrounding stem 47) is still sealed by O-ring 48, and when the cylinder 83 is actuated an additional amount, for example up to a 600 pound force on the coupling 80, the elastomeric insert 81 will compress a sufficient amount so a small lug or bar 84 fastened on the interior of the passageway 82 will engage the end of the stem 47, and move the valve 46 away from its seat so that the O-ring 48 is no longer sealing. This will open the passageway 82 to the passageway 40, which opens at a position between the O-rings 14,14. The seal formed with the elastomeric insert 81 and the rib 45 will maintain the integrity of the connection.

When the valve 46 has been opened, in the process for testing for leaks, a vacuum pump 85 is energized to "rough out" the helium which might be present in passageways 40 and 82. Then, a leak detector 86 (mass spectrometer) is connected to the passageway 82 as well, and any helium leaking from either of the O-rings 14,14 will be detected, and the leak rate can be determined. It should be noted that the outer most O-ring 14 is tested because the exterior of the container itself is in a helium atmosphere and if this ring is leaking, the helium from the exterior of the container will be sensed. The interior of the container 12 is also under a helium atmosphere so that the inner one of the O-rings 14 is simultaneously tested.

After the leak test of the O-rings 14,14 has been completed, it is desirable to make sure that the O-ring 48 is not leaking. This can be done by reflooding the passageways 40 and 82 with helium, and then releasing the force from cylinder 83 a sufficient amount so that the valve 46 will again seat and the O-ring 48 will seal off the passageway for the stem 47. The cylinder 83 is not completely released but is reduced in force, for example to the 200 pound force level, which will continue to maintain the integrity of the seal between the elastomeric insert 81 and the rib 45 while permitting the valve 46 to seat. Then, the pump 85 can be started to evacuate the passageway 82, and subsequently the leak detector 86 can be used to determine whether or not there is any leakage of the helium from the passageway 40 past the O-ring 48, while the seal on the elastomeric insert 81 is being maintained.

If the integrity of the seals is satisfactory, then the fixture for checking the seals is removed, and the container can be used in the normal manner. Elastomeric materials can be used for the coupling seal 81 because the seal is exposed to high temperature only for a short time.

The O-rings 14 are seated only with compression forces acting along the axis of the cylinder and once the O-rings 14 are compressed they are not moved. The twist lock members are locked without twisting the cover plate 20 relative to shoulder 13.

The second or upper plate 21 is resilient enough to permit the springs 25 to continue to exert the high level of force on the lower plate 20 and thus to maintain the seal. Elastomeric O-rings can be used if the container is at lower temperatures. The closing force, and the force exerted by the resilient members between the cover plates may be selected to suit the type of seal used.

What is claimed is:

1. A sealing cover for shipping containers comprising a first plate member, a seal member mounted on a first side of said first plate member and being adapted to engage a surface of a container to be sealed when said first plate member is forced in a first direction, a second plate member overlying said first plate member on a side thereof opposite from said seal member, at least portions of said second plate member being spaced from said first plate member, resilient means between said first plate member and said second plate member positioned to be adjacent the portion of said second plate member overlying said seal member, and a lock member carried by said cover assembly and adapted to cooperate with portions of a container to be sealed whereby said lock member will exert a force on said second plate member and through said resilient means to said first plate member to force said seal member into sealing engagement with a sealing surface on a container on which the cover is mounted.

2. The combination as specified in claim 1 wherein said locking member comprises a twist lock portion rotatably mounted with respect to said second plate member, and means on said second plate member slidably guiding said twist lock portion for limited twist lock movement, said means guiding said twist lock portion being fixed to said second plate member and having portions adapted to carry loads applied to said means guiding in a direction which forces said seal member toward a sealing surface of a container and to transfer said force directly to said second plate member without binding said locking member.

3. The combination as specified in claim 2 wherein said locking member comprises a substantially continuous ring having a plurality of spaced projections extending radially outwardly from said ring.

4. The combination as specified in claim 3 wherein said ring defines a center portion which is open, and an actuating member fixed to said ring and extending inwardly to the open center portion to permit actuating said ring between its locking and unlocking positions.

5. The combination as specified in claim 3 wherein said means guiding said twist lock portion comprises a retainer housing mounted on a surface of said second plate member opposite from said first plate member, said retainer housing having a recess defined therein of size and configuration to receive said ring, and portions of said retainer housing directly engaging said second plate to transfer force exerted on said retainer housing directly to said second plate member.

6. The combination as specified in claim 5 wherein said retainer housing defines a central open space at the center portions of said second plate member, and grappling groove means defined in said retainer housing on a surface thereof surrounding said central open space, said grappling groove means being accessible from the interior of said central open space.

7. The combination as specified in claim 1 wherein said first plate member comprises a generally flat plate, and said seal member comprises O-ring means mounted on a face surface of said plate oriented substantially parallel to the general plane of said plate, adapted to seat on a surface substantially parallel to the face surface.

8. The combination as specified in claim 7 wherein said O-ring means comprises a pair of concentric, substantially annular O-rings mounted on said first plate member, and passageway means defined in said first plate member opening to the face surface of said first plate member between said O-rings, a separate valve member normally sealing said passageway, said valve member having an actuating portion protruding to the exterior of said first plate member whereby said valve member can be opened from the exterior of said first plate member.

9. The combination as specified in claim 8 and a valve opening defined at the exterior of said first plate member, a coupling member to actuate said valve member and having a passageway adapted to be connected to said valve member through said opening, said coupling member including a sealing member encircling the valve opening, said sealing member forming a fluid tight seal surrounding said opening when the coupling member is forced toward said first plate member at a first force level, and means on said coupling member adapted to engage and open said valve member when said coupling member is forced toward said first plate member at a second higher force level than said first force level.

10. The combination as specified in claim 6 wherein said valve member in said first plate member is mounted adjacent the center of said first plate member and said second plate member has a center opening adjacent the center thereof to permit access to said valve member.

11. The combination as specified in claim 1 wherein said second plate member is fixed to said first plate member in the center portions thereof, said second plate member having a recess defined on a surface thereof facing said first plate member so that said second plate member is spaced from said first plate member adjacent the outer periphery thereof, said sealing means and said resilient means being positioned adjacent the outer periphery of said first plate member.

12. The combination as specified in claim 11 wherein said resilient means comprise Belleville spring washers positioned between said first plate member and said second plate member.

13. In a container having an upper neck portion, said upper neck portion defining a center opening of said container, said neck portion defining a peripheral shoulder surface on the interior thereof facing toward the opening of said container, said neck portion further including a plurality of inwardly facing lugs spaced around the periphery thereof adjacent to the opening, and said lugs having locking surfaces on the side thereof facing in the direction toward the peripheral surface but being of greater distance from the center of the opening of the neck portion than said peripheral surface, the improvement comprising a cover member adapted to fit within said opening of said neck portion, said cover member having first means including a seal member adapted to engage said peripheral surface, and second support means overlying said first means on a side of said first means opposite from the peripheral surface of said neck portion, bias means between said first means and said second means, and a locking member carried by said second means on a surface thereof opposite from said bias means, said locking means including radially extending lugs extending outwardly from the second means to fit under said lugs on said neck portion when the bias means are compressed to hold said second means in a position exerting a force through said bias means onto said first means, and onto said seal member against said pripheral surface.

14. The combination as specified in claim 13 wherein said first means comprises a closure plate having said seal member adjacent its periphery, and said second means comprises a support plate attached to said first plate at locations spaced from the periphery, and said bias means being positioned between said closure plate and said support plate adjacent the portions of said closure plate overlying said seal member.

15. The combination as specified in claim 14 and a retainer for said locking means comprising a retainer member supported directly on said support plate, said retainer member having means defined thereon to permit sliding movement of said locking means with respect to said retainer member from position engaging the under surfaces of said lugs on said neck, to position to clear said lugs on said neck.

16. The combination as specified in claim 14 wherein said bias means comprise Belleville spring washers between said closure plate and said support plate.

17. The combination of claim 13 wherein said seal member comprises a pair of coextensive seals which are spaced apart and engage said neck portion, and passageway means defined in said first means opening between said seals, and a separate actuable valve member normally sealing said passageway from the exterior of said container.

* * * * *

UNITED STATES PATENT AND TRADEMARK OFFICE
CERTIFICATE OF CORRECTION

PATENT NO. : 3,997,078
DATED : December 14, 1976
INVENTOR(S) : DONALD F. MELTON ET AL.

It is certified that error appears in the above–identified patent and that said Letters Patent are hereby corrected as shown below:

Column 4, line 43 "downward" should be --downwardly--.
Column 9, line 17, (Claim 10, line 1) "Claim 6" should be --Claim 8--.

Signed and Sealed this

First Day of March 1977

[SEAL]

Attest:

RUTH C. MASON
Attesting Officer

C. MARSHALL DANN
Commissioner of Patents and Trademarks